United States Patent [19]

Allen

[11] Patent Number: 5,418,713
[45] Date of Patent: May 23, 1995

[54] APPARATUS AND METHOD FOR AN ON DEMAND DATA DELIVERY SYSTEM FOR THE PREVIEW, SELECTION, RETRIEVAL AND REPRODUCTION AT A REMOTE LOCATION OF PREVIOUSLY RECORDED OR PROGRAMMED MATERIALS

[76] Inventor: Richard Allen, 111 E. Myrna La., Tempe, Ariz. 85284

[21] Appl. No.: 102,413

[22] Filed: Aug. 5, 1993

[51] Int. Cl.$^6$ .................................. G06F 153/00
[52] U.S. Cl. ............................................. 364/403
[58] Field of Search ............... 364/403, 406, 478, 479; 360/15, 14.1, 14.2, 14.3; 369/84, 85; 455/3.1, 4.1, 4.2, 6.3; 348/7

[56] References Cited

U.S. PATENT DOCUMENTS

| | | | |
|---|---|---|---|
| 3,946,220 | 3/1976 | Brobeck et al. | 235/168 |
| 3,970,992 | 7/1976 | Boothroyd et al. | 340/172.5 |
| 3,990,710 | 11/1976 | Hughes | 360/15 |
| 4,232,295 | 11/1980 | McConnell | 340/825.25 |
| 4,328,544 | 5/1982 | Baldwin et al. | 364/405 |
| 4,410,917 | 10/1983 | Newdoll et al. | 360/15 |
| 4,528,643 | 7/1985 | Freeny, Jr. | 364/900 |
| 4,590,516 | 5/1986 | Abraham | 348/7 |
| 4,593,376 | 6/1986 | Volk | 364/900 |
| 4,597,058 | 6/1986 | Izumi et al. | 364/900 |
| 4,654,799 | 3/1987 | Ogaki et al. | 364/479 |
| 4,672,554 | 6/1987 | Ogaki | 364/479 |
| 4,674,055 | 6/1987 | Ogaki et al. | 364/479 |
| 4,703,465 | 10/1987 | Parker | 369/30 |
| 4,763,317 | 8/1988 | Lehman et al. | 370/58.1 |
| 4,787,050 | 11/1988 | Suzuki | 364/479 |
| 4,803,348 | 2/1989 | Lohrey et al. | 235/381 |
| 4,949,257 | 8/1990 | Orbach | 364/401 |
| 5,029,333 | 7/1991 | Graves et al. | 370/58.1 |
| 5,084,768 | 1/1992 | Stern et al. | 358/342 |
| 5,113,351 | 5/1992 | Bostic | 364/479 |
| 5,172,413 | 12/1992 | Bradley et al. | 455/3.1 |
| 5,220,420 | 6/1993 | Hoarty et al. | 455/4.2 |
| 5,237,157 | 8/1993 | Kaplan | 235/375 |
| 5,247,347 | 9/1993 | Litteral et al. | 455/4.2 |

OTHER PUBLICATIONS

"New Music Retailing Technology Says, Listen Here"; Matt Rothman, New York Times. (Jul. 4, 1993).
"Music Store Grow Larger And Livelier ... ," Patrick Reilly, Wall Street Journal, pp. B1, B5. (Jun. 18, 1993).

Primary Examiner—Donald E. McElheny, Jr.
Attorney, Agent, or Firm—Mauro Premutico

[57] ABSTRACT

An on demand data delivery system is provided for the manufacture of original content recordings at a remote location. A data capture facility for retrieving data from an item of material is connected to a data resampling means for compressing data which is accessible to a storage facility connected to a central host server. The central host server is connected to a communications network for communication to a remote server which controls a manufacturing control device connected thereto. The manufacturing control device duplicates original content recordings on blank media upon receipt of a data representation of the original content recording from the remote server which retrieves said data representation for a selected original content recording from the central host server over the communications network.

5 Claims, 7 Drawing Sheets

APPARATUS AND METHOD FOR AN ON DEMAND DATA DELIVERY SYSTEM FOR THE PREVIEW, SELECTION, RETRIEVAL AND REPRODUCTION AT A REMOTE LOCATION OF PREVIOUSLY RECORDED OR PROGRAMMED MATERIALS

FIELD OF THE INVENTION

The present invention relates to an on demand data delivery system for the preview, selection, retrieval and reproduction at remote locations of original recordings or programmed entertainment and informational software together with related textual and graphical material and artwork (hereinafter referred to as "titles") on selected media including compact disks, minidisks, analog and digital audio cassette tapes, video cassette tapes, magnetic disks, magneto optical disks and video game (EPROM and FLASHROM) cartridges.

BACKGROUND OF THE INVENTION

Current methods of inventory management in retail stores for titles (such as music recordings and video game software) held for resale fail to optimally satisfy consumer demand and increase product cost. These deficiencies result principally from the cost of financing large inventories of titles held for resale and the failure to accurately anticipate consumer demand for individual titles and implement proper inventory management practices to satisfy such demand. These problems can have a significant adverse impact both on retailers and on the producers and distributors of items sold at retail.

As currently structured, retailers typically must maintain a large in-store inventory of titles for resale in order to be assured they have sufficient supply to satisfy consumer demand for such items. In addition, retailers often must maintain a large in-store inventory of titles to provide a means of displaying and merchandising titles within the retail environment. For example, consumers of products such as audio compact discs or cassette tapes typically browse through a large number of displayed titles to find a preferred selection and to determine if there are other titles which they are not aware of that they may desire to purchase. Moreover, while such "browsing rack" displays are presently the most widely practiced form of in-store merchandising of consumer music and video game titles, they offer limited merchandising and cross promotional opportunities other than grouping by general subject categories and alphabetizing the artist or game titles thereunder.

Often, however, large amounts of inventory are not sold and must be discounted to a price which generates consumer interest. In addition, insufficient inventories of popular titles result in lost sales which may be subsequently made by a competitor or lost altogether due to a loss of consumer interest in the title originally sought to be purchased. Moreover, particularly with respect to music titles, a large number of unrealized sales may result from a lack of inventory of older titles for which there is limited individual demand, but which in their aggregate could result in significant sales volume. There also tend to be unrealized sales when older titles no longer carried in inventory (or stocked only in limited quantities) become popular as a result of unexpected publicity or popularity of a title or artist resulting from receipt of an award by the artist for a recent work or past achievement or the use of a song in a newly released medium.

These "inventory management" issues have a significant impact on the producers and distributors of music, video game and other entertainment titles. In industries such as music and video game software, which are characterized by "hit" titles for which there may be very high consumer demand for a relatively brief time cycle, accurate inventory management is particularly important. A misjudgment in the number of expected sales of a particular music or video game software title (and related decisions regarding number of units of such title produced and distributed) could result in missing a significant market opportunity (for a short-cycle "hit" title for which limited supply is available) or a loss situation (resulting from the investment of a significant amount of money in producing and distributing a title for which there is no consumer demand and, as a result, an unwanted overstock of product). Overstock in particular can be a significant problem to producers and distributors of music and video game software titles that maintain policies of "buying back" or accepting returns without penalty of all or a portion of overstocked inventory or providing credits towards future product purchases by retailers.

Recognizing some of these shortfalls, systems have previously been proposed for the reproduction of titles at a point of sale location as they are purchased. Although these proposals have recognized some of the advantages in implementing such a system, they have been impractical for commercial implementation due to their inability to deliver necessary data for the reproduction of titles in an economically viable manner and within practical time constraints. For instance, U.S. Pat. No. 4,528,643 to Charles C. Freeny, Jr. (the "Freeny device") describes a system having a remote information control machine for updating data stored in an information manufacturing machine located at a point of sale location. The information manufacturing machine includes means for reproducing prerecorded music titles on eight track tapes with data stored in its internal memory. The Freeny device further provides that the information manufacturing machine receive authorization from the remote information control machine prior to the reproduction of a music title at the point of sale locations. The information control machine in the Freeny device serves to receive captured data, convert the data to a digital format and update the data storage facility located within the information manufacture machine. Data stored in a memory file unit within each information manufacturing machine is provided with an encoding scheme which serves as a security system for the unauthorized reception of the data necessary for the manufacture of the material object.

The Freeny device has several drawbacks which make the system impractical for commercial implementation: (1) the data file for each title requires a large memory storage capacity, (2) each remote location must have on site data storage for every title to be manufactured, (3) data delivery to point of sale locations for anything beyond a short authorization code and other sale tracking data is impractical in cost and time requirements, and (4) manufacturing time for titles not stored on site in the data storage facility for a particular remote location is slow (and commercially impractical for the consumer retailing environment).

The implementation of a commercially practical on demand data delivery system for the preview, selection, retrieval and reproduction at remote locations of titles on selected media within the time constraints of a retail shopping experience would eliminate or substantially reduce the deficiencies in current retail practices described above. It would afford a great commercial advantage both to retailers and producers using the system. In addition, the system would optimally satisfy consumer demand by providing virtually limitless inventory of popular titles which can be previewed and selected for purchase through an easy to use terminal that provides a unique shopping experience. Moreover, it would eliminate the need to produce and transport to remote locations previously recorded or programmed titles for which there is little or no consumer demand, resulting in a much more efficient use of energy and resources than is possible with existing practices.

It is therefore an object of the invention to provide a commercially practical on demand data delivery system for the preview, selection, retrieval and reproduction at remote locations of above described titles and additional materials. It is a further object of this invention to provide a system which permits for improved marketing, selection and previewing capabilities without the need for maintaining large inventories of materials at a point of sale location.

SUMMARY OF THE INVENTION

The present invention is directed to a system for the preview, selection, retrieval and reproduction at remote locations of titles on selected media and for maintaining, at one or more primary storage facilities, accounting data associated with the preview, selection and/or reproduction (and sale) transactions. As contemplated in one preferred embodiment of the invention, data representing titles is "captured" and stored in one or more primary storage facilities (and in certain cases discussed below, at one or more remote locations where titles are reproduced). The captured data representing the title may include a reproducible audio portion, a full motion video/audio portion, a graphics and text portion, an accounting information portion and an identification portion which are stored in an item data file.

The audio portion of the item data file is mathematically resampled to remove unnecessary audio data (i.e., data outside a specified amplitude and frequency range). This mathematical resampling reduces by a significant amount (up to 90%) the data that is required to be stored and transmitted in connection with the preview, selection, retrieval and reproduction processes. As a result, it permits real time transfer of data between a remote location and a primary storage facility and makes the system function within realistic commercial time constraints.

The system may incorporate statistical counting data base files for determining which item data files are high use files at any given remote locations. Based upon statistical data information, such as the number of times a specific item data file is retrieved by the remote location(s), the system maintains high use item data files in the location which provides the most efficient/economical access to such item data files, which may be located at either the remote locations or in the fastest storage medium available away from the remote locations. This "caching" system may be used to reduce telecommunications costs and allow for economical use of on-site storage. The system may also incorporate multiple storage medium facilities having varying speeds of retrieval. The statistical counting data may be used to place more active item data files on the fastest storage medium and less active item data files on slower speed storage medium facilities. The hierarchical storage scheme facility may be located at a remote location, at a primary storage facility or at both locations. Such a caching system may be employed to make the most efficient use of available resources at either the remote locations or at the central locations. The statistical counting data base files would be updated frequently to reflect the most recent trends at specified locations. Moreover, item data files (for new "hit" titles, for example) could be provided with a predetermined statistical weight in order to optimize availability of data needed for the system to meet consumer demand.

The system may also incorporate multiple consumer interface terminals (located at remote locations) that allow consumers to preview or "browse" a data base of titles and select titles for purchase. The consumer interface terminal may include a touch screen/monitor interface and sound amplification devices which enable the consumer to preview titles in a unique shopping experience. Access to the consumer interface terminal may be predicated upon a consumer providing unique demographic and other identifiers which the system will compile together with system activity data to create a consumer profile database. This database could be used to promote to a specific consumer those items which such consumer's previous system activities indicate he or she may be predisposed to purchase (or show additional interest in). This may be accomplished by having an advertisement/promotion data base which may include data that is displayed to those consumers having a predefined demographic or purchasing habit. In addition, the consumer profile database will be a source of virtually real-time aggregate market data indicating which consumer populations (grouped according to a variety of demographic segments) are purchasing or previewing a particular type of title. The consumer interface terminal may eliminate the need for maintaining a large inventory of physical product at the remote location for merchandising.

Once the item data file is retrieved based on either consumer selection through the consumer interface terminal or direct remote location request, the portion of the item data file necessary for the specified function, either preview or reproduction, is appropriately formatted and, in the case of preview, directed to the consumer interface terminal, or, in the case of reproduction, directed to the appropriate manufacturing device for duplication of a title in a specified format. The instigation of the reproduction process initiates an accounting process that includes updating the accounting system based on the accounting information portion of the item data file. This accounting system regulates all debit and credit activity between title providers and remote locations.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

By way of example, the present invention is illustrated in terms of a system for use in a retail music store which sells music recordings in multiple formats including, but not limited to, compact disks and analog cassette tapes. The system of which a preferred embodiment is illustrated herein may be used in a number of different applications which would be obvious to those skilled in the art. The following examples are provided for the purpose of aiding in explaining the present invention. The system's applications should not be limited to the description provided herein.

Figure 1:
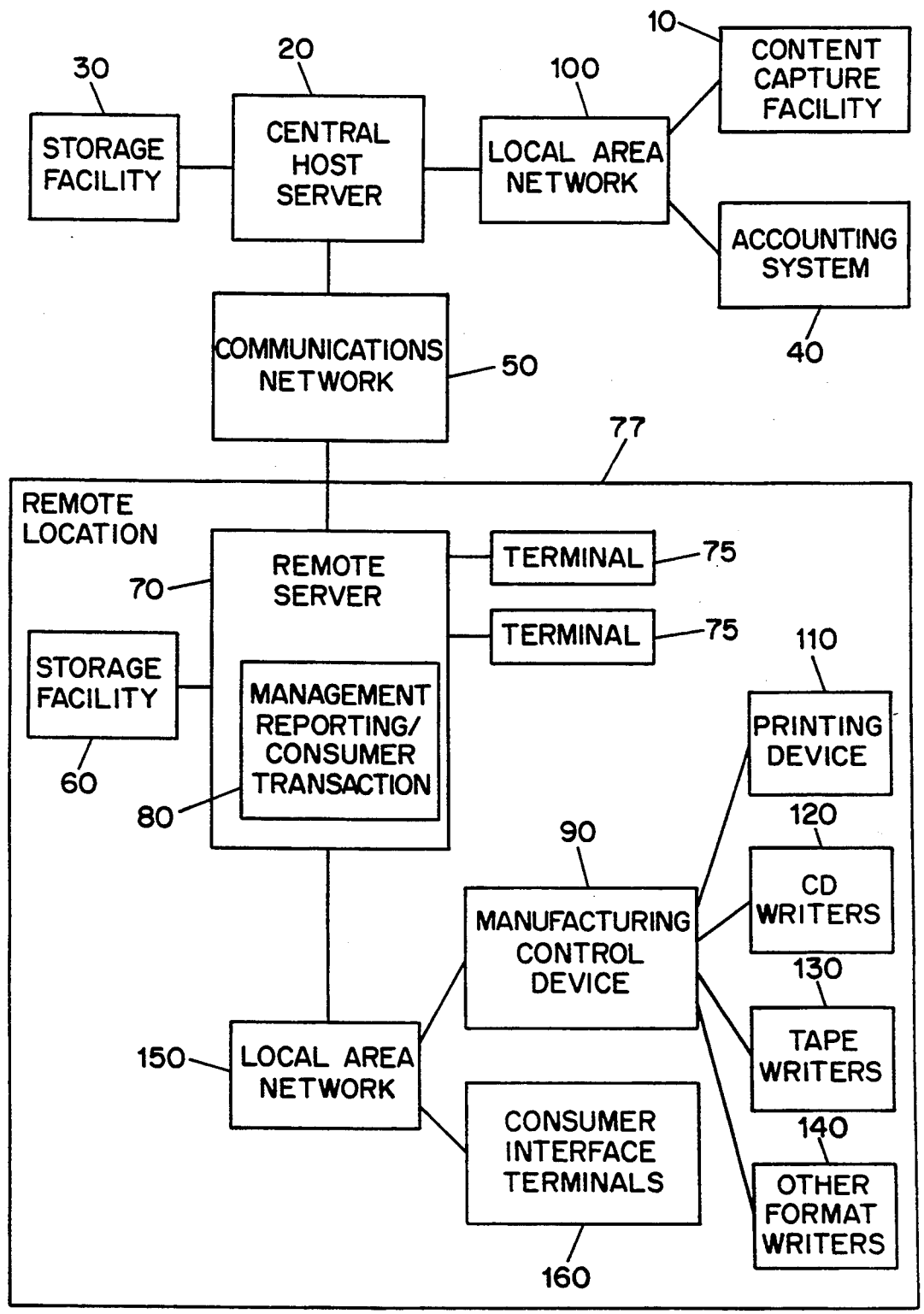
FIG. 1 is a functional block diagram of a device embodying the present invention.

Shown in FIG. 1 is a general block diagram of a system embodying the present invention which allows a remote location such as a retail store to operate without having to maintain a large physical inventory of titles for distribution and/or resale. Generally speaking, the system shown in FIG. 1 permits a consumer (not shown) to select a specific title for preview or reproduction at a remote location 77 whereby digital information necessary for the preview or reproduction (on selected media) of the selected title is sent over communications network 50 to a remote server 70. If the selected title is to be reproduced, the remote server 70 delivers necessary data for reproduction of the selected title to a manufacturing control device 90 that controls a writing device corresponding to the selected product, i.e., CD writers 110, tape writers 130 or other format writers 140.

An item data file is generated for each title from corresponding items of material captured into the system. The item data file in the preferred embodiment described herein includes all the information necessary for the preview and reproduction on selected media at a remote location of a selected title. The item data file in the storage facility 30 will be retrieved by a remote location 77 for either reproduction by the manufacturing control device 90 or preview through the consumer interface terminal 160. In order to make the system commercially practical for purposes of transmitting data to remote locations 77 in realistic time periods, the audio data portion of the item of material is mathematically resampled and digitally compressed during the content capture process to reduce its size and thus shorten the overall transmission time of the related item data file over the communications network 50. The mathematical resampling process produces a data stream representation of the audio portion of the item of material which may be reduced to a fraction of its original size. Since in its original, unsampled and uncompressed format the audio portion represents a major portion of all the data in the item data file, and thus corresponds to a significant data storage requirement for the system, the ability to significantly reduce its size, corresponding storage space and transmission time results in an economic savings both in storage and in communication transmission costs and makes the system function within realistic commercial time constraints.

Likewise, other items of material including full motion video/audio recordings and graphical/textual materials and artwork, are compressed during the content capture process to reduce their size and shorten transmission time.

The item data files captured by the content capture facility 10 are then transferred to the central host computer 20 via local area network 100 where they are automatically cataloged and entered into a storage data base in the storage facility 30. Although only one central host server 20 is shown, the content capture facility 10 could be connected to more than one such central host server 20.

The item data files entered into the storage facility 30 are made available to all of the remote locations 77 connected through the communications network 50. For the purpose of simplicity only one remote location 77 is illustrated in FIG. 1.

The remote server 70 at the remote location 77 controls all preview, reproduction and management reporting tasks and the local area network 150 which connects the remote server 70 and the manufacturing control device 90 at the remote location 77. The remote server 70 may be provided with a statistical counter data base to manage its storage facility 60 so that the most frequently requested item data files are stored locally and thus use of the communications network 50 is efficiently managed and optimized. The information necessary for the statistical counter data base is constantly updated to reflect changes in remote location 77 activity patterns. This, in conjunction with a dynamic caching control algorithm, may change the item data files held in storage facility 60 to reflect the most current statistical information gathered at the remote location 77.

The consumer preview capability at the remote location 77 is enabled by the remote server 70 which is connected to the consumer interface terminal 160 by the local area network 150. Although only one consumer interface terminal 160 is shown, the system would preferably have a plurality of such interfaces sufficient to satisfy consumer demand. The local area network 150 has sufficient bandwidth to adequately provide video and audio information to multiple consumer interface terminals 160 simultaneously.

The manufacturing process is directed from the remote server 70. The remote server 70 controls the manufacturing control device 90 which in turn may be coupled to one or more format manufacturing devices, i.e., a CD writing device 120, a tape writing device 130, or to other format writers 140 (e.g., video tapes, DCC tapes or microchip recorded devices). The manufacturing control device 90 may also be connected to a printing device 110, which is preferably a color printer or a color copier which receives bit stream data, for printing graphic output corresponding to a selected format for a reproducible title. The manufacturing control device 90 receives data from the remote server 70 over the local area network 150, reformats the mathematically resampled reproducible audio portion of the item data file and provides the appropriate data to the writing devices (110, 120, 130, or 140) in a form necessary to produce a duplication of a title on a media usable by a consumer on a standard playing device.

The remote server 70 allows for a management reporting/consumer transaction system 80 to maintain all accounting and customer transaction data relating to all activities at remote location 77 which give rise to any and all credit obligations. Such data may be delivered to the central host 20 for central roll-up and reporting. The management reporting system 80 may be interfaced through one or more terminals 75.

Figure 2:
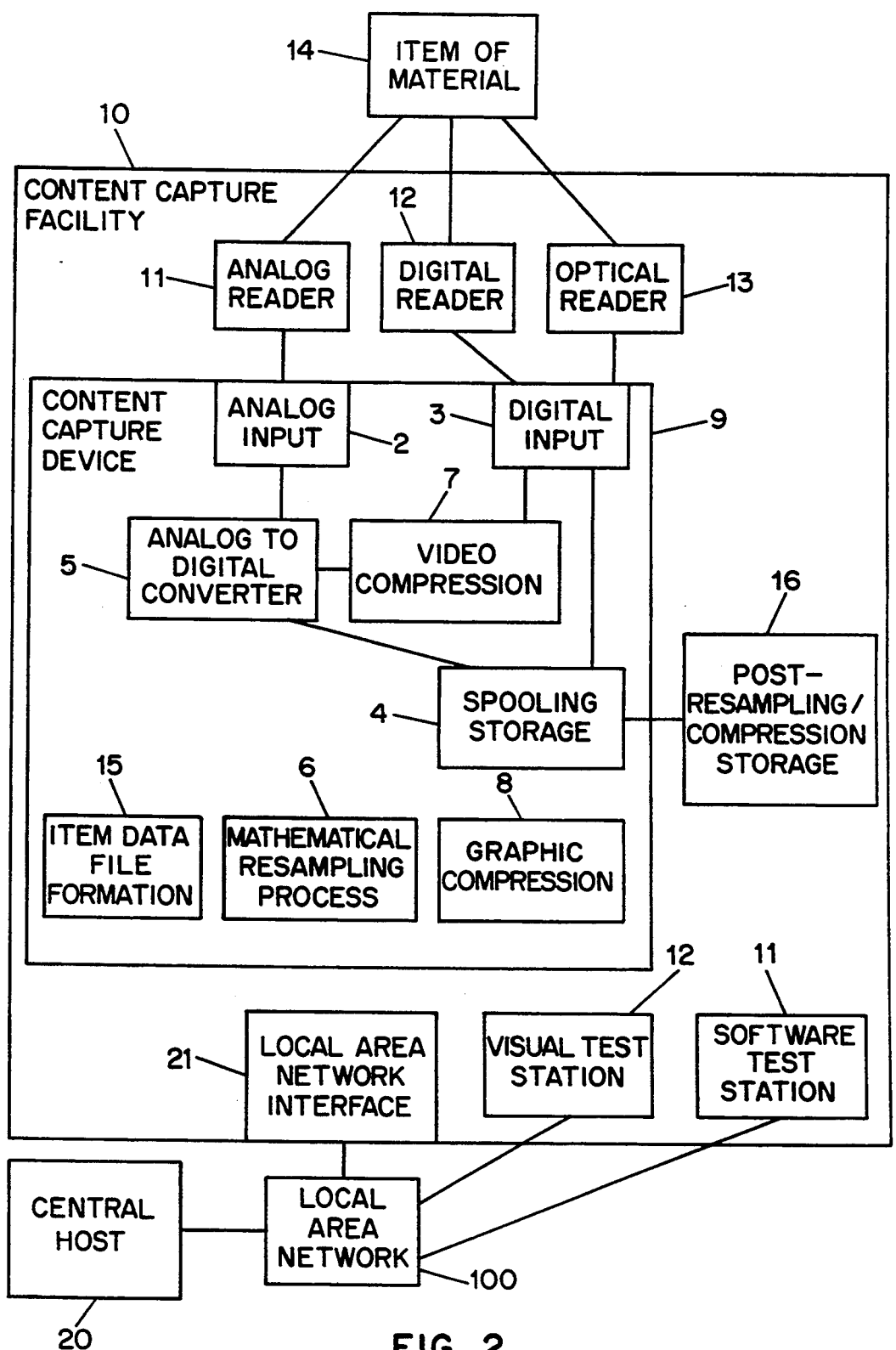
FIG. 2 is a functional block diagram of a content capture device used in a preferred embodiment of the present invention.

Shown in FIG. 2 is a functional block diagram of a content capture facility 10 used to capture a data representation of the items of material 14 used in the preview and reproduction of titles at the remote locations 77. Such data from the items of material might include analog signals that are sampled and converted to digital data, digital bit stream input, and graphic pictures and text that are scanned and converted to digital data.

In a preferred embodiment of the present invention for the herein described application, three types of data are captured at the capture facility 10. They are audio data, full motion video/audio data, and graphic data. As part of the content capture process, an item data file is created via the item data file formation process 15 that associates these files for each title (in this case an original music recording) and also includes associated accounting information (needed to identify all entities to whom any payment of monies is required for reproductions of the reproducible item) and identification information (needed to catalog the title for database usage).

The content capture device 9, which could consist of an ISA (Industry Standard Bus Architecture) computer utilizing a 486-based CPU (Central Process Unit) from Intel, has two input ports, analog input 2 and digital input 3, which receive data from the appropriate reader devices. In the case of analog input 2 it receives input from analog reader 11. In the case of digital input 3 it receives input from digital reader 12 or optical reader 13. All of readers (11, 12, 13) read information from the item of material 14.

The reproducible audio portion of the item of material 14 takes one of two paths when being captured by the content capture facility 10. If the reproducible audio information portion is in analog form, such as magnetic tape, then it is read by analog reader 11, which could be a magnetic tape player, and transferred through analog input 2 to the analog-to-digital converter 5 and after conversion to a digital bit stream, transferred to the spooling storage 4 within the content capture device 9. In a preferred embodiment, the digital audio bit stream received from the analog-to-digital converter 5 is a 16 bit block data stream of binary data and is sampled at a minimum of 40,000 times per second, corresponding to the Nyquist rate. If the reproducible audio portion of the item of material 14 is in digital form, such as D-1 or D-2 tape or digitally mastered compact disk, then it is read by digital reader 12, which could be a D-1, D-2 or compact disk player, and transferred through digital input 3 to the spooling storage 4 within the content capture device 9.

Mathematical resampling processor 6 within the content capture device 9 is then directed to begin a mathematical resampling of the reproducible audio portion held at the spooling storage 4. The mathematical resampling process 6 utilizes a psycho acoustics equation that saves all audible information in a designed audio amplitude and frequency range, i.e. the amplitude range of human hearing (20 HTZ–20,000 HTZ). The 16 bit block data stream of binary data representing the reproducible audio portion is matched against a psycho acoustic table with respect to its time, frequency and amplitude values. Values that are determined to fall outside the 20 HTZ to 20,000 HTZ range are discarded and the data representation for the item is thereby reduced. This process results in digital compression of the audio portion. Algorithms for performing such comparative functions are commercially available and include the DCC format from the Philips Corporation and the Dolby AC2 audio comparative algorithm.

Once this mathematical resampling process 6 takes place, the compressed audio portion is transferred to the postresampling/compression storage 16, which may be a high speed magnetic hard disk or other storage medium.

The full motion video/audio portion of the item of material 14 can take one of two paths when being captured by the content capture facility 10. If the full motion video/audio portion is in analog form, such as VHS tape or laser disk, then it is read by analog reader 11, which could be a video cassette player or a laser disk player, and transferred through analog input 2 to the analog-to-digital converter 5 and after conversion the bit stream data is compressed by the video compression process 7 and transferred to the spooling storage 4 within the content capture device 9. If the full motion video portion is in digital form, such as D-1 or D-2 tape, then it is read by digital reader 12, which could be a D-1 or D-2 player, and transferred through digital input 3 to video compression process 7 is spooled to the spooling storage 4 within the content capture device 9 after compression. In the preferred embodiment, the video compression process 7 might take place using the MPEG1 video compression standard and could be facilitated using software, hardware or a combination of both. At this point, all compressed full motion video/audio files are transferred to the postresampling/compression storage 16.

The graphics portion of the item of material 14, which may include packaging artwork and insert materials, are read by optical reader 13, which could be an optical scanner, and transferred through digital input 3 to the spooling storage 4 within the content capture device 9. The content capture device 9 initiates the graphic compression process 8 whereby the graphic data file held at the spooling storage 4 is compressed. In the preferred embodiment, the graphic compression process 8 might take place using the JPEG graphic compression standard and could be facilitated using software, hardware or a combination of both. At this point, all compressed graphic files are transferred to the postresampling/compression storage 16.

Once files are transferred to the postresampling/compression storage 16, they are ready for quality assurance inspection. All files, audio, full motion video/audio and graphics, are accessed over the local area network 100 by the software test station 11 and integrity tests are performed on them. Additionally, full motion video/audio and graphics files are accessed over the local area network 100 by the visual test station 12 where they are visually reviewed for integrity and quality. After the quality assurance process has been completed all files remain in the postresampling/compression storage 16 and are ready to be formed into an item data file. At this point content capture device 9 initiates the item data file formation process 15 whereby an item data file is created that associates these files, as well as the accounting information and identification information files, for each title. The complete item data file is then sent via the local area network 100 to the central host server 20 for storage on the storage facility 30. Simultaneously, the master item data file index 28 held at the central host server 20 is updated to reflect the availability of the new item data file. Additionally, this information is sent over the communications channel 50 to all remote locations 77 on a regularly scheduled basis to update the remote server index 78 and the local database 168.

Figure 3:
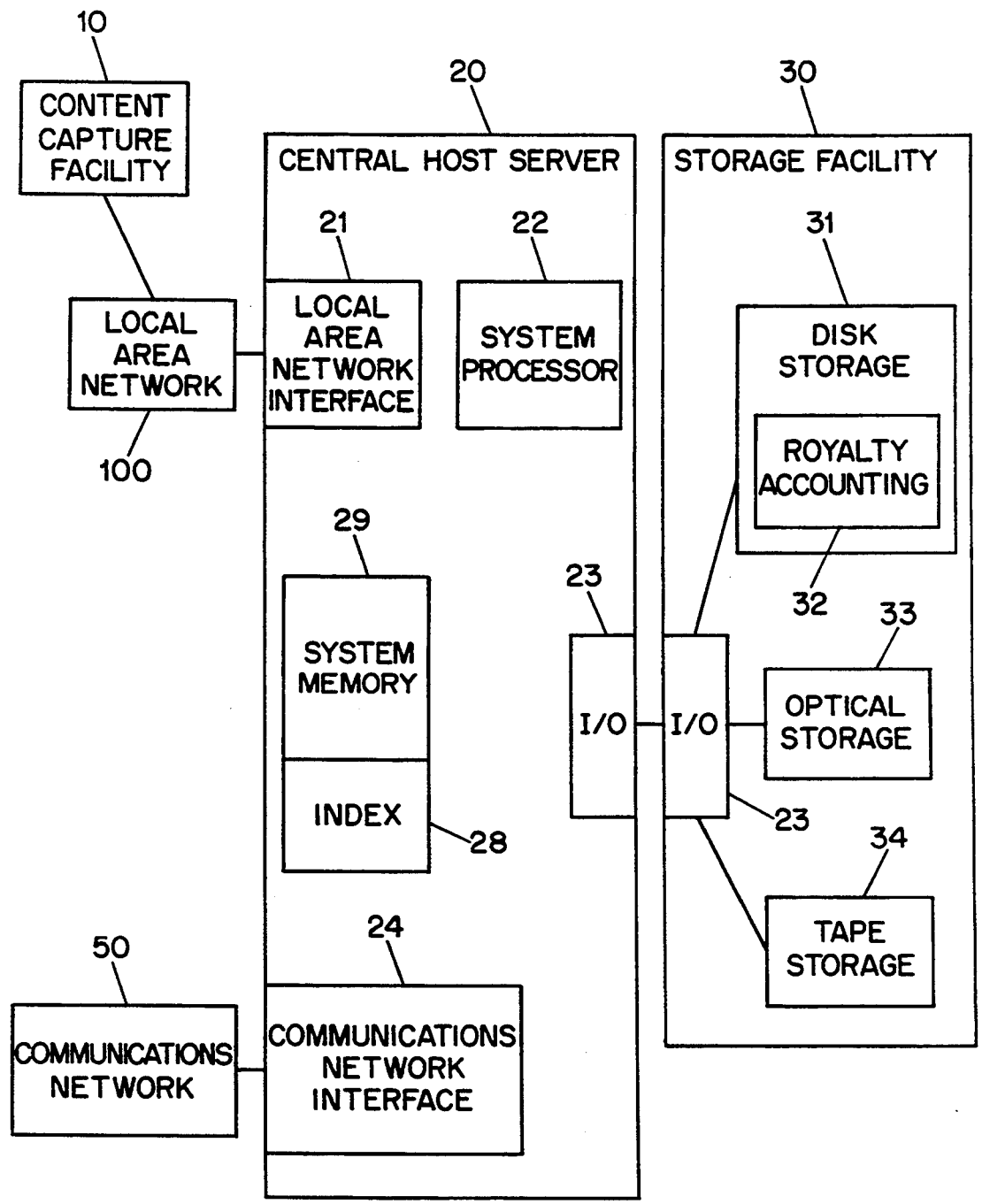
FIG. 3 is a functional block diagram of a central host server and its related components used in a preferred embodiment of the present invention.

FIG. 3 is a functional block diagram of the central host server 20 and the storage facility 30. In a preferred embodiment, the central host server 20 could be either an EISA (Extended Industry Standard Architecture) or a microchannel architecture based system, or other architecture with a high speed system bus that moves information inside the computer from storage to system memory 29 for processing and back to storage or to output devices. The system processor 22 within the central host server 20 may be a single- or multiprocessor 486-based system. The central host server 20 is preferably an open architecture system so as to accept future additional peripheral equipment.

Compressed item data files arrive into the central host server 20 from the content capture facility 10 over the local area network 100. The system processor 22 catalogs the information into an index 28 stored in system memory 29 that can be recalled and then transferred through the I/O 23, which might be a SCSI connection, to the storage facility 30.

In a preferred embodiment of the invention, statistically high use item data files are preferably maintained in the storage facility 30 on high speed disk storage 31. Statistically moderate use item data files are preferably maintained on moderate speed optical storage 33. All item data files are preferably maintained on slow speed tape storage 34 for near line access and redundant archival storage. The accounting royalty system 32 which will be accessed frequently by the central host server 20 for maintaining accurate information for accounts payable, accounts receivable, royalty accounting, billing information, general ledger and blank media inventory is preferably maintained on the high speed disk storage 31.

This hierarchical storage architecture puts frequently access materials on higher speed storage medium which also tend to be higher cost devices versus slower speed which tend to be less expensive storage mediums. Thus, a compromise between access speed and cost may be achieved that is practical for a given circumstance or use.

The central host server 20 receives requests for item data files from remote locations 77 via the communications network 50. After the system processor 22 determines the location of the desired item data file, the central host server 20 retrieves the item data file and transfers it through the communications network interface 24 to the remote location 77 over the communications network 50.

In a preferred embodiment, the central host server 20 is connected by a communications network 50, which might be supported by either fiber optic or satellite transmission services, to the remote locations 77. The communications network 50 will utilize packet technology operating at preferably not less than 45 million bits per second. After the central host server 20 receives a request for an item data file, the index 28 is updated to reflect the request and the location of the item data file. The requested item data files are retrieved from the storage facility 30 via the I/O 23 and packetized according to one of a number of well known schemes wherein large data files are segmented with header and trailer information attached that identifies the packet and serves as instructions for reassembling the data file. The packetized segments of the item data file are then sent through the communications network interface 24 over the communications network 50 to the requesting remote location 77.

The updated index 28 may, based on this new request activity, relocate the item data file to its statistically preferred storage medium within the storage facility 30. For example, increased requests for an item data file stored on optical storage 33 (moderate use) may cause the relocation of this item data file to high speed disk storage 31 (high use).

Figure 4:
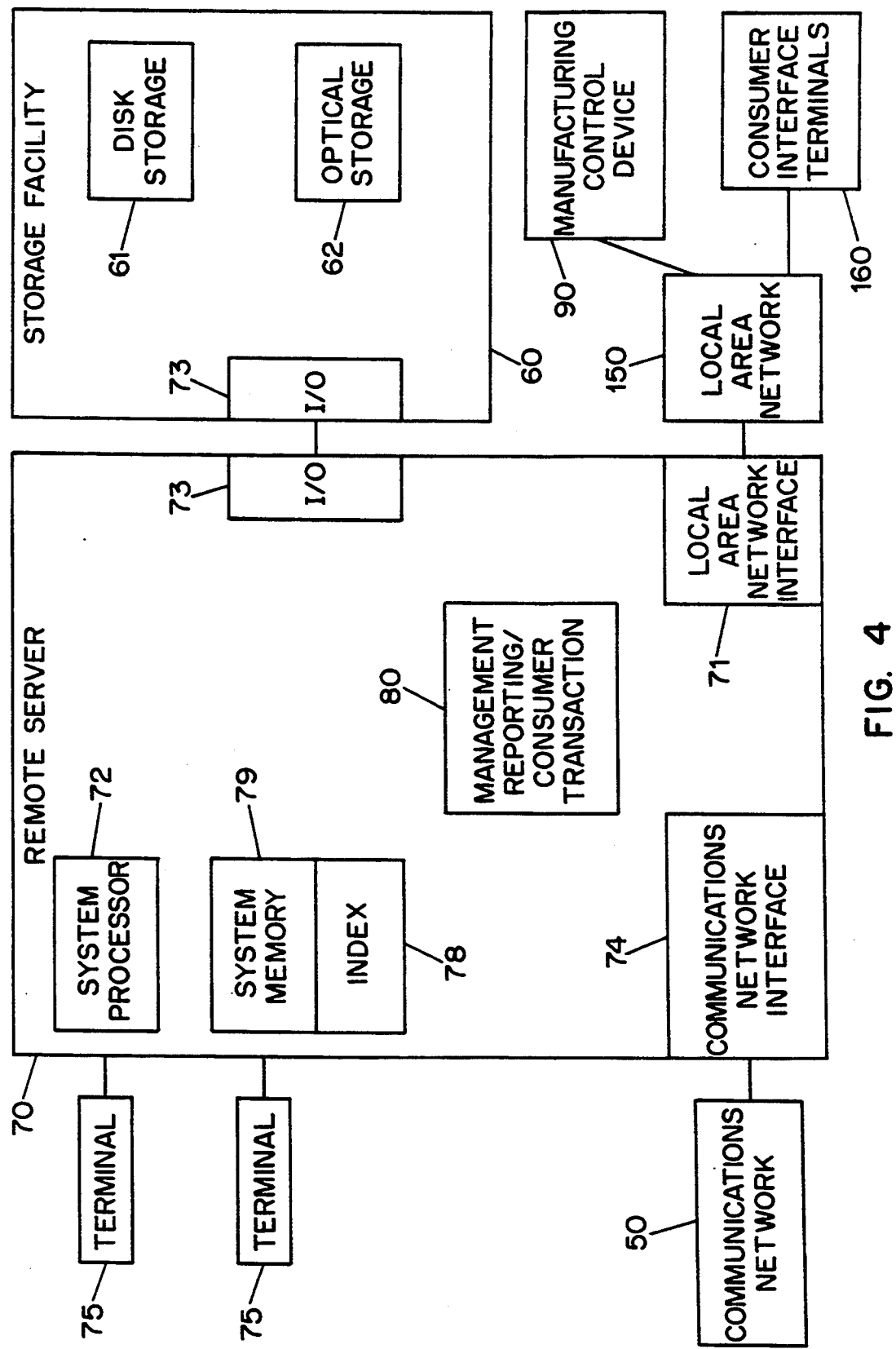
FIG. 4 is a functional block diagram of a retail host server and its related components used in a preferred embodiment of the present invention.

FIG. 4 is a functional block diagram of the remote server 70 and the storage facility 60. In a preferred embodiment, the remote server 70 could be either an EISA (Extended Industry Standard Architecture) or a microchannel architecture based system, or other architecture with a high speed system bus that moves information inside the computer from storage to system memory 79 for processing and back to storage or to output devices. The system processor 72 within the remote server 70 may be a single or multiprocessor 486-based system. The remote server 70 is preferably an open architecture system so as to accept future additional peripheral equipment. The remote server 70 is the controller for communications to the central host server 20. The primary function of the remote server 70 is to process requests for item data files received from the consumer interface terminals 160 and the terminals 75 (for direction to the manufacturing control device 90), locate such item data files regardless of their location, i.e., whether they reside on storage facility 60 connected to the remote server 70 or on storage facility 30 connected to the central host server 20, and to direct such item data files to their appropriate point of request.

Terminal 75, which is attached to remote server 70, can be used to access and manipulate information in management reporting/consumer transaction subsystem 80, as well as to direct manufacturing requests to manufacturing control device 90. Such requests may include remanufacturing or replacement of unsatisfactory product.

Based on remote location 77 activity and item data file requests, packetized file segments arrive over the communications network 50 from the central host server 20. Upon arrival through the communications network interface 74, the packetized segments are stripped of their header and trailer information and concatenated based on the instructions carried in the header and trailer to reform the original item data file delivered by the central host server 20. The system processor 72 catalogs the item data file request into the index 78 stored in system memory 79 and then directs the item data files to the appropriate requesting device, either the consumer interface terminal 160 or the manufacturing control device 90, through the local area network interface 71 and over the local area network 150. Additionally, if the statistically counter within the index 78 determines that the item data file should be stored on the storage facility 60, then the system processor 72 directs the item data file through the I/O 73 to the appropriate storage device at the storage facility 60.

In the preferred embodiment of the invention, the storage facility 60 allows for a small cache of the most demanded item data files to be maintained at the remote location 77 and managed by the remote server 70. The remainder of the item data files available through the system and required by the remote location 77 would be delivered over the communications network 50 from the central host server 20.

Within the storage facility 60, statistically high use item data files are maintained on high speed disk storage 61. Statistically moderate use item data files are maintained on optical storage 62. Data of low demand is discarded from the storage facility 60 when the statistical counter within the index 78 overwrites it with an item data file of higher use. The remote location 77 does not require all potential levels of storage medium in the storage facility 60 and could be operated with little or no remote location 77 storage.

The management reporting/consumer transaction process 80 tracks remote location 77 activity and is used to update data within royalty accounting 32 at the central host server 20. The royalty accounting 32 is updated upon duplication of an original content recording at the remote location 77 based on information contained within the accounting information portion of the item data file.

Figure 5:
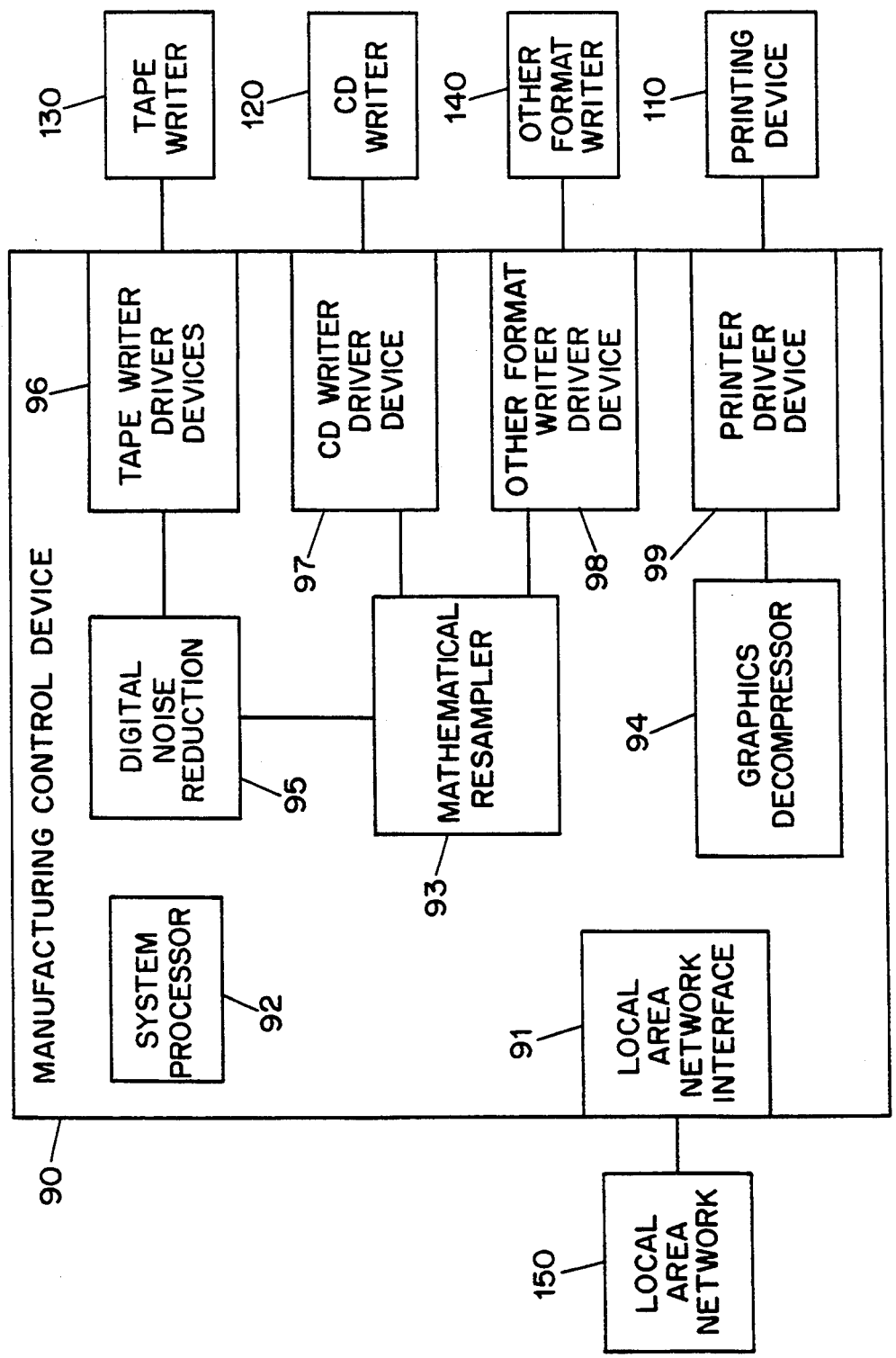
FIG. 5 is a functional block diagram of a manufacturing device and its related components used in a preferred embodiment of the present invention.

FIG. 5 is a function block diagram of the manufacturing subsystem that includes the manufacturing control device 90 and the product writing devices, printing device 110, CD writers 120, tape writers 130 and other format writers 140. The primary function of the manufacturing control device 90 is the processing of item data files for the duplication of titles. In the herein described embodiment, the manufacturing control device 90 does not request or locate item data files, but simply receives them.

Manufacturing requests may be directed by remote personnel by way of a data input terminal 75 connected to the remote server 70 which are then sent through the local area network interface 91, over the local area network 150, to the manufacturing control device 90.

The appropriate portions of the item data file needed to produce a duplication of the title are received by the manufacturing control device 90 from the remote server 70 over the local area network 150 through the local area network interface 91. The system processor 92 directs the audio portion of the item data file to the mathematical resampling process 93 where an algorithm reformats the data into a reproducible audible signal which has been reextended with the desired frequency, amplitude range and psycho acoustics to play in real time.

If the desired product format is an analog cassette tape, then the resampled audio portion is directed to the digital noise reduction process 95 where its digital streams are noise reduced by a digital equation noise reduction algorithm utilizing a Digital Signal Processor (DSP). From there the noise reduced and resampled audio portion is directed to the tape writer driver device 96 where it is segmented into two parts which represent the reproducible audio programming for sides A and B of a conventional analog cassette tape. Once segmented, the programming for side B is reversed, both sides are then converted from digital to analog signals and the two file segments are then sent to the analog tape writer 130 to be written simultaneously.

The analog cassette tape is produced by a high speed tape writer 130 (such as the 16 times real-time Otari device) utilizing outside the shell blank magnetic tape media loaded into a "C—O" cassette shell. A "C—O" is an empty cassette tape shell with leader only before loading.

After the mathematical resampling process 93, if the desired product format is a compact disk, then the resampled audio portion is directed to the CD writer driver device 97 where it is processed and sent to the high speed CD writer 120 (such as the 2-times real-time Kodak CD-R device). The CD writer produces the duplication of the title on a blank CD-R media, also commercially available from Kodak as well as TDK, Mitsui Toatsu and others.

If the desired product format is an other format, then the resampled audio portion is directed to the other format writer driver device 98 where it is processed and sent to the high speed other format writer 140 and reproduced on writable other format blank media.

The system processor 92 directs the text and graphics portion of the item data file to the graphics decompressor process 94 where it is expanded to its original content size. This process could be accomplished using the JPEG decompression algorithm. The decompressed information is sent to the printing device 110 for reproduction. The printing device 110 could be any of a number of commercially available color copiers such as the Canon 550 or the Xerox 5750 that can be configured to receive binary file input. In a preferred embodiment, the reproduction of the text and graphics information occurs in conjunction with the production of the above mentioned audio portion.

Figures 6, 7:
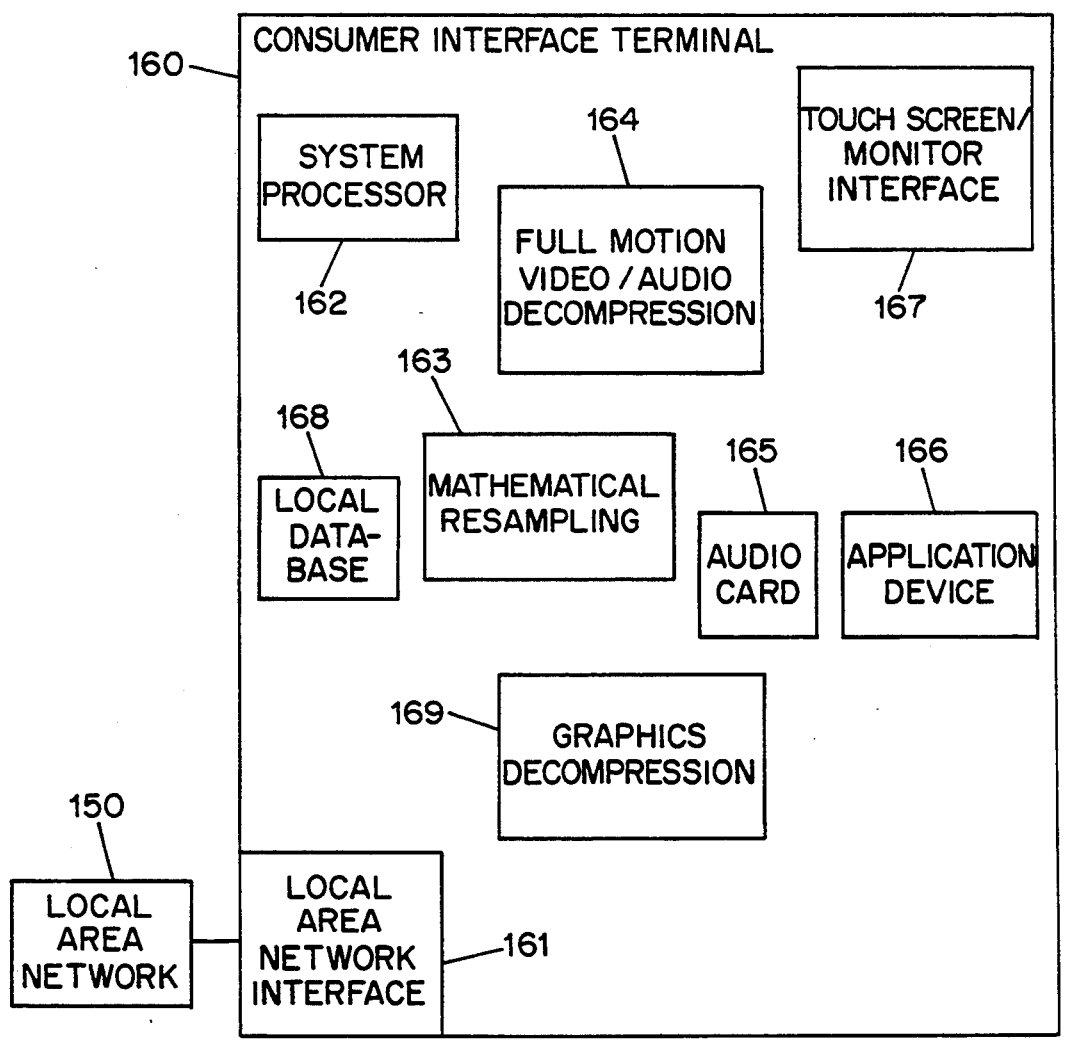
FIG. 6 is a functional block diagram of a consumer interface terminal and its related components used in a preferred embodiment of the present invention.
FIG. 7 is schematic representation of an item data file for a previously recorded material.

FIG. 6 is a functional block diagram of a consumer interface terminal 160. In a preferred embodiment, the consumer interface terminal 160 could be an EISA (Extended Industry Standard Architecture), ISA (Industry Standard Architecture), microchannel architecture based system or other architecture with a high speed system bus that moves information inside the computer for processing. The system processor 162 within the consumer interface terminal may be an X86-based system. The consumer interface terminal 160 is preferably an open architecture system so as to accept future additional peripheral equipment.

The consumer interface terminal 160 allows review of a database of titles and facilitates search for a particular title via several criteria (i.e. artist, label, producer, etc.). After identifying the title of interest through the search method, the consumer interface terminal 160 allows for the preview of segments of the graphics portion of the item data file representing that title, preview segments of the audio portion of the same item data file, preview of segments of the full motion video/audio portion of the same item data file, and selection of such title for purchase in a desired format.

All database search and preview request actions at the consumer interface terminal take place through the touch/screen monitor interface 167. Local database 168, which contains textual identification information for each item data file available on the system whether located at the storage facility 60 or stored at the storage facility 30, directs requests for specific segments of the item data file through the local area network interface 161 over the local area network 150 to the remote server 70. The local database 168 is updated to reflect additions to the index 28 at the central host server 20 to insure that the consumer interface terminal 160 has access to all available item data files.

As part of the search process the local database 168 will request a segment of the graphic portion of the item data file from the remote server 70. Upon receipt of the requested segment of the graphic portion of the item data file from the remote server 70 over the local area network 150 and through the local area network interface 161, the system processor 162 directs the segment of graphics portion of the item data file to the graphics decompression process 169 where it is expanded to its original content size. This process could be accomplished using the JPEG decompression algorithm. The decompressed graphic information is sent to the touch screen/monitor interface 167 for display.

In the event that the request from the local database 168 is for a segment of the audio portion of the item data file, then upon receipt of the requested segment of the audio portion of the item data file from the remote server 70 over the local area network 150 through the local area network interface 161, the system processor 162 directs the segment of the audio portion of the item data file to the mathematical resampling process 163 where an algorithm reformats the data into a reproducible audible signal which has been reextended with the desired frequency, amplitude range and psycho acoustics to represent the original audio item of material and play in real time. The resampled segment of the audio portion of the item data file is then sent to the audio card 165 which produces an audible signal which is then amplified by the amplification device 166 for playback through any of a number of speaker devices. The audio card 165 could be a Sound Blaster/16 or a Turtlebeach Sound Card. The amplification device 166 could be any of a number of commercially available sound amplifiers such as those available through consumer electronics companies such as Yamaha, Sony and Panasonic.

In the event that the request from the local database 168 is for a segment of the full motion video/audio portion of the item data file, then upon receipt of the requested segment of the full motion video/audio portion of the item data file from the remote server 70 over the local area network 150 through the local area network interface 161, the system processor 162 directs the segment of the full motion video/audio portion of the item data file to the full motion video/audio decompression process 164 where it is expanded to its original size. This process could be accomplished using the MPEG1 decompression algorithm. The decompressed full motion video/audio information is sent to the touch screen/monitor interface 167 for video display and to the amplification device 166 for simultaneous playback through speaker devices.

All purchase request actions by the consumer (not shown) take place through the touch screen/monitor interface 167. Local database 168 directs such requests for duplication of titles in a specified format through the local area network interface 161 over the local area network 150 and through the remote server 70 to be staged on terminal 75 for processing.

FIG. 7 shows a representation of an item data file 250 which is the result of the content capture facility 10 whereby items of material representing a title are processed for inclusion in the system.

As part of the item data file formation process 15, an identification data file 251 is generated that catalogs basic information, such as title, artist, publisher, and date of origin, about the title represented by the items of material. This identification data file 251 serves to update the index 27 at the central host server 20, and subsequently to update the local database 168 within the consumer interface terminal 160.

Information regarding the payment of monies associated with the duplication of the title is entered in conjunction with the item data file formation process 15 within the content capture device 9 and identified as the accounting information file 252. This accounting information file 252 is referenced during the manufacturing process to insure that all obligations due because of the duplication of the title, such as royalty obligations, are appropriately logged and accounted for.

The data required to duplicate the audio portion of the title is captured during the content capture process from the appropriate item of material and identified as the reproducible audio file 253 of the item data file 250.

The data required to reproduce the graphics portion of the title is captured during the content capture process from the appropriate item of material and identified as the graphics file 254 of the item data file 250. The graphics file 254 may include information regarding specific printer device commands to insure proper reproduction.

The information captured during the content capture process from the full motion video/audit item of material is identified within the item data file as the full motion video/audio file 255. This full motion video/audio file 255 is used primarily for the purposes of preview at the consumer interface terminal 160.

Figure 8:
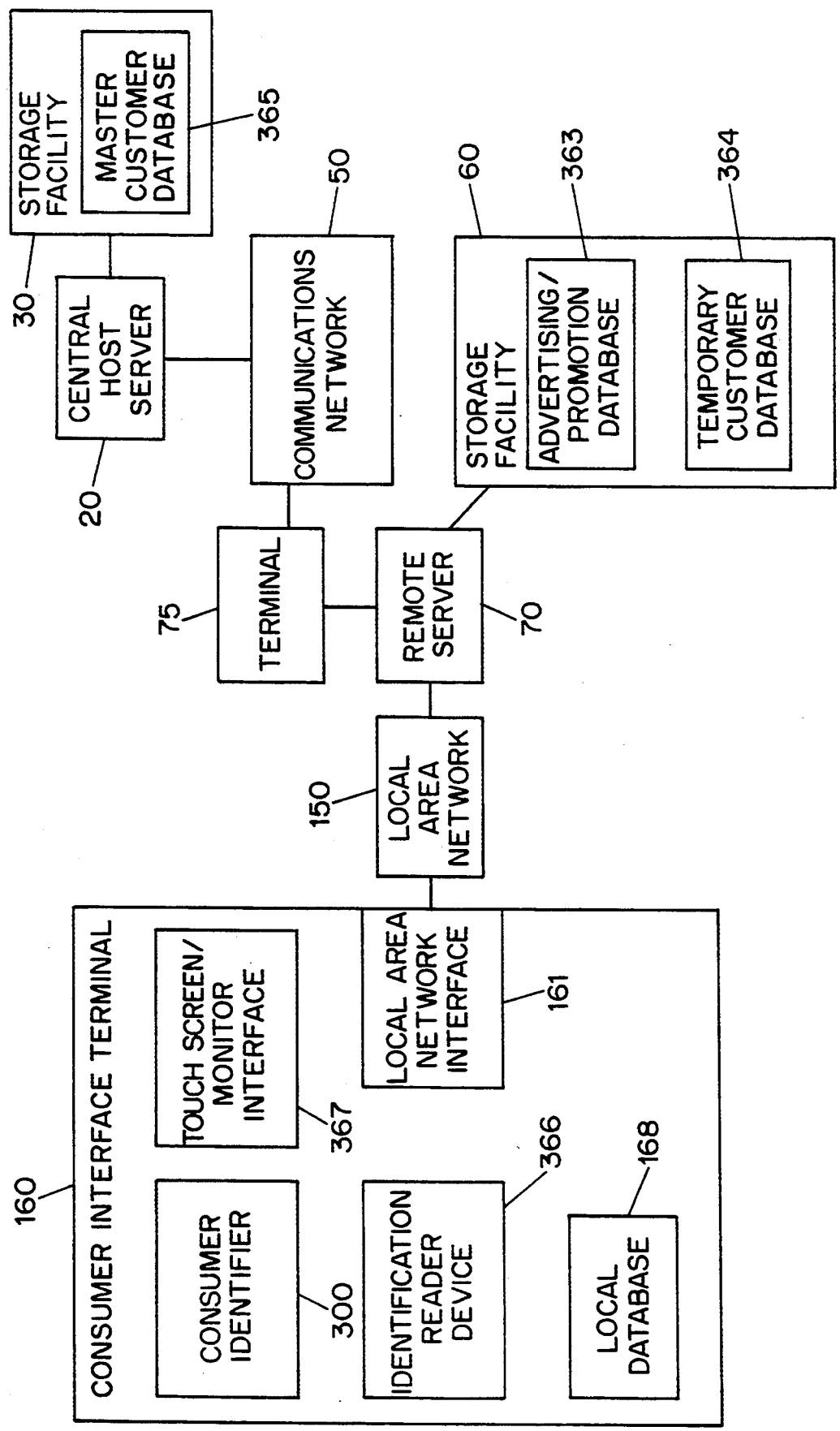
FIG. 8 is a block diagram of a preferred embodiment of a consumer interface terminal and its related components using consumers' data profiles.

FIG. 8 is a functional block diagram of a preferred embodiment of the invention in which the consumer interface terminal 160 is enhanced by the addition of a consumer identifier 300. This embodiment includes a smart interface capability which allows for the creation of unique consumer identification data files that would serve to enable the targeted direction of specific and identifiable messages which may include advertising and promotion. Through a dynamic process, the unique consumer identification data files are continually updated based on consumer activities via the consumer interface terminal 160, and such updated consumer identification data files may direct new and unique messages over time.

To access the consumer interface terminal 160 in this embodiment, the consumer would be required to uniquely identify themselves through the consumer identifier process 300. Such unique identification could be facilitated by use of magnetic stripe or bar-code technology which includes a corresponding identification reader device 366, or with a unique personal identification code entered through the touch screen/monitor interface 367. The consumer receives his unique identifier after providing certain unique profile information, including, but not limited to, name, address, gender, age, income range and entertainment and personal preference information. Such information is input through terminal 75 to remote server 70 to form a unique consumer profile data file that is sent over the communications network 50 to the central host server 20 for storage in the master customer database 365 within storage facility 30.

The consumer identifies themselves through the consumer identifier process 300 within the consumer interface terminal 160. This consumer identifier process 300 includes sending a request through the local area network interface 361 and over the local area network 150 to the remote server 70 for the retrieval of the unique consumer profile data file stored at the master customer database 365. This request is processed by the remote server 70 and sent over the communications network 50 to the central host server 20 which retrieves the unique consumer profile data file from the master customer database 365 within the storage facility 30 and returns said file over the communications network 50 to the remote server 70 which directs it to the temporary customer database 364 within the storage facility 60.

Once the unique consumer profile data file has been stored at the temporary customer database 364, it is used in conjunction with the advertising/promotion database 363 to direct unique messages within the advertising/promotion database 363 to the consumer, based on compiled information contained in the unique customer profile data file, as directed by the remote server 70. Such messages would be sent by the remote server 70 over the local area network 150 to the consumer interface terminal 160 for display through the touch screen/monitor interface 367 as part of the consumer shopping and preview experience. These messages, which could include public service announcements, commercial advertisements and promotions, notifications of special events and/or factoids, could be used during any period where the consumer is waiting for an item data file request to be retrieved.

Information from the unique consumer profile data file may also be used by the local database 168 to facilitate the consumer search process. This might include notifying the consumer, based on information within the unique consumer profile data file, of a given item data file currently available, i.e., the consumer may have purchased duplications of multiple titles by a given artist, and said given artist may have recently released a new title which the local database 168 can now make available.

While the unique consumer profile data file resides in the temporary customer database 364, it is updated to reflect consumer activity at the consumer interface terminal 160 such as item data file preview and purchase.

After the consumer shopping and preview experience is complete, the updated unique consumer profile data file stored in the temporary customer database 364 is sent by the remote server 70 over the communications network 50 to the central host server 20 to update the master customer database 365 within the storage facility 30.

The master customer database 365 may be shared by all remote locations 77 through the central host server 20 via the communications network 50 to insure accurate identification of consumers at multiple remote locations 77 within the system, thus enabling completely accurate compilation of unique consumer activity.

The above embodiments are provided only for the purpose of explaining specific applications of the applicant's claimed invention and it will be appreciated by those skilled in the art that the applicant's invention is not limited to what has been particularly shown and described hereinabove. There are many other applications for the system which are not herein described but which would become obvious to those skilled in the art in view of the herein described invention. For instance, the system could be used to premanufacture duplications of original content recordings on selected media at the remote locations if the statistical counter data field for such original content recordings exceeds a predetermined value. For example, if a new original content recording for an artist is released, the remote server at the remote location could dedicate time to the remote locations' manufacturing control device for the duplication of the original content recording of the new release. Alternatively, the system could simply use just-in-time inventory principles and manufacture products at the remote locations as they are selected by consumers for purchase. Such a system would be preferred if the remote location was provided with sufficient consumer interface terminals and writing devices to meet demand.

The accounting system used in the hereinabove described system may also be implemented in a number of different ways. For example, the accounting system located in the central host facility could be used as a reference for determining when payment and credit obligations are generated, i.e., to whom money is owed for duplication of original content recordings. The actual accounting system could be maintained at either the central location, or at the remote locations. The accounting system at the remote location could also serve to track any and all payment obligations arising out of activity by the manufacturing control device.

The herein described storage facilities could also be reorganized in a number of different ways without straying from the invention. For example, different configurations of data storage equipment could be provided at both the remote locations and at the central locations in order to implement the caching system which is described herein. In addition, many of the compression, decompression and data manipulation facilities described herein could be performed through either software, hardware or a combination of both. Such distinctions are not crucial to the spirit of the claimed invention and should not be so limited. The modification between software and hardware logic is well known to those skilled in the art. The scope of the applicant's invention is defined only by the claims which follow.

I claim:

1. A system for generating an item data file at a central location and using said item data file to manufacture a selected title and associated packaging material for said selected title and associated material at a remote location, said system comprising:

a data capture facility for capturing a plurality of content and corresponding informational data for each of a plurality of available titles, said corresponding informational data including an associated materials manufacturing data portion;

a central mass storage facility at the central location coupled to the data capture facility for storing the captured content and corresponding informational data for each of the plurality of available titles in a corresponding item data file;

a central host server at the central location coupled to said central mass storage facility for retrieving and transmitting the corresponding item data file for the selected title upon receipt of a data request command for the selected title;

a communications network coupled to the central host server for transmitting said data request command to the central host server;

a remote server at the remote location coupled to the communications network for receiving the item data file for the selected title transmitted by the central host server over the communications network upon sending the data request command to the central host server over the communications network and for producing a corresponding bit stream data representation of said selected title and associated packaging material upon receipt of said item data file from the central host server;

a manufacturing facility coupled to the remote server at the remote location for manufacturing the selected title and associated packaging materials from the bit stream data representation received from the remote server; and a selection device coupled to the remote server at the remote location for selecting the title for manufacturing at the manufacturing facility and for generating and transmitting the selection command to the remote server corresponding to the selected title, whereby selection of the title at the selection device results in the manufacture of the selected title and associated packaging material at the remote location.

2. The manufacturing system of claim 1 wherein the item data file further includes a likelihood of remote use indicator and the remote server is coupled to a remote location memory storage device for storing the received item data file at the remote location if the likelihood of remote use indicator for the received item data file is within a predetermined value range.

3. The manufacturing system of claim 2 wherein the central host server further includes an index of authorized remote servers indicative of remote servers authorized to receive the item data file corresponding to the selected title and said transmission of the item data file corresponding to the selected title is permitted only upon receipt of a remote server authorization code from the remote server included in said index of authorized remote servers from the remote server in conjunction with the data request command corresponding to the selected title.

4. The manufacturing system of claim 3 further comprising a central server accounting file stored on a nonvolatile memory facility at said central location for tracking the manufacturing of the selected title at the remote location, said non-volatile memory facility being coupled to and updated by said central host server upon receipt of a data request command and the remote server authorization code from said remote server.

5. A system for using an item data file retrieved from a central location over a communication network to manufacture a user selected title at a remote location on a blank media corresponding to a user selected format, said manufacturing system comprising:

a capture facility located at the central location for capturing content data and corresponding informational data including a plurality of formatting codes for each of a plurality of available titles;

a storage facility coupled to said capture facility located at the central location for storing the content data and informational data transmitted by the capture facility for each of the plurality of titles in a corresponding item data file;

a central host server located at the central location coupled to said storage facility and said communications network for retrieving from the storage facility and transmitting over the communications network the corresponding item data file for the selected title to be manufactured at the remote location upon receipt at an item data file request command for said selected title over the communication network;

a remote host server at the remote location coupled to the communications network for transmitting the item data file request command to the central host server over the communications network and receiving said item data file from the central host server over the communications network and for transmitting a stream of content data for the selected format upon receiving the item data file request command and a selected format command;

a user selection facility coupled to said remote server for receiving a user selection command identifying the selected title to be manufactured at the remote location and the selected format, and for transmitting the item data file request command and the selected format command corresponding to the selected title and the selected format to the remote host server; a title manufacturing facility coupled to said remote server and including the blank media corresponding to the selected format for receiving the stream of content data from said item data file for high-speed recording on said blank media, receiving a stream of content data; and a packaging manufacturing facility for manufacturing graphical and textual packaging for the manufactured title.

* * * * *